United States Patent
Baldreich et al.

(10) Patent No.: US 10,641,162 B2
(45) Date of Patent: May 5, 2020

(54) CONNECTOR FOR CONNECTING CONDUITS FOR LIQUID OR GASEOUS MEDIA

(71) Applicant: Henn GmbH & Co KG., Dornbirn (AT)

(72) Inventors: Wolfgang Baldreich, Dornbirn (AT); Harald Hartmann, Dornbirn (AT)

(73) Assignee: Henn GmbH & Co KG., Dornbirn (AT)

( * ) Notice: Subject to any disclaimer, the term of this patent is extended or adjusted under 35 U.S.C. 154(b) by 131 days.

(21) Appl. No.: 15/766,505

(22) PCT Filed: Oct. 3, 2016

(86) PCT No.: PCT/EP2016/073541
§ 371 (c)(1),
(2) Date: Apr. 6, 2018

(87) PCT Pub. No.: WO2017/060185
PCT Pub. Date: Apr. 13, 2017

(65) Prior Publication Data
US 2018/0299051 A1 Oct. 18, 2018

(30) Foreign Application Priority Data
Oct. 7, 2015 (AT) ................................. 50856/2015

(51) Int. Cl.
*F16L 37/088* (2006.01)
*F02B 33/44* (2006.01)
*F02M 35/10* (2006.01)

(52) U.S. Cl.
CPC ....... *F02B 33/44* (2013.01); *F02M 35/10144* (2013.01); *F16L 37/0885* (2019.08)

(58) Field of Classification Search
CPC ........................... F16L 37/088; F16L 37/0841
(Continued)

(56) References Cited

U.S. PATENT DOCUMENTS 5,855,399 A * 1/1999 Profunser ............. B60T 17/043
285/305
7,597,362 B2 10/2009 Hartmann
(Continued)

FOREIGN PATENT DOCUMENTS

AT         509 196 B1      7/2011
DE   10 2008 027204 A1   12/2009
(Continued)

OTHER PUBLICATIONS

International Search Report of PCT/EP2016/073541, dated Jan. 2, 2017.
(Continued)

Primary Examiner — Aaron M Dunwoody
(74) Attorney, Agent, or Firm — Collard & Roe, P.C.

(57) ABSTRACT

The invention relates to a connector (2) comprising a connector body (5), the connector body (5) having at least one sleeve-type outer casing section (13) which when viewed in cross-section surrounds a central longitudinal axis (8) of the connector (2). At least two passages (33) are formed in the outer casing section (13), the passages being provided for receiving an end section of a locking element (6). The locking element (6) is designed to secure the connector (2) relative to a mating connector (3), and a retaining element (38) for securing the locking element (6) is arranged in at least one of the passages (33). The retaining element (38) is designed as a formed sheet metal part and a separate retaining element (38) is provided for each passage (33').

9 Claims, 7 Drawing Sheets

(58) Field of Classification Search
USPC .................................................. 285/321, 305
See application file for complete search history.

(56) References Cited

U.S. PATENT DOCUMENTS

| | | | |
|---|---|---|---|
| 8,997,328 B2 | 4/2015 | Hartmann et al. | |
| 9,657,878 B2 | 5/2017 | Hartmann | |
| 2007/0236013 A1* | 10/2007 | Hartmann | F16L 37/088 285/321 |
| 2008/0191471 A1* | 8/2008 | Hartmann | F16L 37/0841 285/231 |
| 2008/0191481 A1* | 8/2008 | Hartmann | F16L 37/088 285/344 |
| 2008/0252070 A1* | 10/2008 | Hartmann | F16L 37/088 285/147.3 |
| 2009/0102181 A1* | 4/2009 | Hartmann | F16L 37/088 285/26 |
| 2012/0146326 A1* | 6/2012 | Williams | F16L 37/0841 285/314 |
| 2013/0009393 A1* | 1/2013 | Hartmann | F16L 13/147 285/45 |
| 2015/0101173 A1* | 4/2015 | Hartmann | F16L 37/088 29/525.01 |
| 2017/0074444 A1 | 3/2017 | Nezu | |
| 2017/0146159 A1* | 5/2017 | Hartmann | B21D 39/046 |
| 2017/0227153 A1* | 8/2017 | Nezu | F16L 37/1225 |
| 2018/0038535 A1* | 2/2018 | Hartmann | F16L 37/088 |
| 2018/0126441 A1* | 5/2018 | Rist | B21D 39/046 |
| 2018/0299050 A1* | 10/2018 | Baldreich | F16L 37/088 |
| 2018/0299051 A1* | 10/2018 | Baldreich | F16L 37/088 |
| 2019/0242508 A1* | 8/2019 | Gaurat | F16L 37/144 |

FOREIGN PATENT DOCUMENTS

| | | |
|---|---|---|
| EP | 2 360 411 A1 | 8/2011 |
| WO | 2005/045299 A1 | 5/2005 |
| WO | 2005/103550 A1 | 11/2005 |
| WO | 2005/103551 A1 | 11/2005 |
| WO | 2009/094679 A1 | 8/2009 |
| WO | 2011/106805 A1 | 9/2011 |
| WO | 2013/166536 A1 | 11/2013 |
| WO | 2015/141557 A1 | 9/2015 |

OTHER PUBLICATIONS

International Search Report of PCT/EP2016/073540, dated Jan. 2, 2017.

* cited by examiner

CONNECTOR FOR CONNECTING CONDUITS FOR LIQUID OR GASEOUS MEDIA

CROSS REFERENCE TO RELATED APPLICATIONS

This application is the National Stage of PCT/EP2016/073541 filed on Oct. 3, 2016, which claims priority under 35 U.S.C. § 119 of Austrian Application No. A 50856/2015 filed on Oct. 7, 2015, the disclosure of which is incorporated by reference. The international application under PCT article 21(2) was not published in English.

BACKGROUND OF THE INVENTION

1. Field of the Invention

The invention relates to a connector for connecting conduits for liquid or gaseous media.

2. Description of the Related Art

From EP 2 360 411 A1 a generic connector is known for a motor vehicle. The connector for connecting conduits for liquid or gaseous media comprises a sleeve which has an insertion opening. A connecting piece can be inserted into the insertion opening. Furthermore, the connector comprises a locking spring surrounding the sleeve at least over a portion of its circumference, which locking spring can be adjusted between a locking position for locking the connecting piece fitted to the connector and a release position that is locked relative to the sleeve, in which the locking connection with the connecting piece is released and the connecting piece can be removed from the insertion opening of the sleeve. The locking spring projects at least in its locking position over at least a portion of its longitudinal extension in which it can be locked to the connecting piece through a passage of the sleeve into the inner space surrounding the sleeve. Furthermore, wherein the locking spring is locked in place in its locked release position in at least one locking position of the locking spring behind a holding projection of the sleeve in a holding recess of the sleeve. The holding projection projects relative to the holding recess in the axial direction of the sleeve.

The connector of EP 2 360 411 A1 has a complex structure and is therefore difficult to manufacture.

SUMMARY OF THE INVENTION

The objective of the present invention was to overcome the disadvantages of the prior art and provide a device which is easy to manufacture and also functions well in an installed state.

This objective is achieved by a device according to the invention.

The device according to the invention is a connector for a motor vehicle, comprising a connector body, which connector body comprises at least one sleeve-like outer casing section surrounding in cross-section a central longitudinal axis of the connector. In the outer casing section at least two passages are formed which are provided for receiving an end section of a locking element. The locking element is provided for securing the connector relative to a counter connector, wherein in at least one of the passages a holding element is arranged for securing the locking element. The holding element is designed as a sheet-formed part and for both passages a separate holding element is provided.

An advantage of the device according to the invention is that the holding element can be easily mass-produced. In particular, a holding element, which is designed as a sheet metal molded part, can have the lowest possible mass and yet still have high strength and high rigidity. Due to the face that a separate holding element is provided for both passages, the latter can also be inserted easily into the connector body of the connector.

Furthermore, it can be advantageous that the connector body comprises an annular space, which lies between a sleeve-like inner casing section surrounding in cross-section the central longitudinal axis and the outer casing section of the connector, wherein the inner casing section is surrounded by the outer casing section and the inner casing section of the connector body is connected to the outer casing section at a first end section by a first end wall section and the casing sections are open to one another at a second end section, wherein the at least two passages pass both through the inner casing section and the outer casing section. In particular, a connector body designed in this way has good functionality for insertion in the connector according to the invention.

Furthermore, it is possible that the holding element comprises a fastening section, by means of which the holding element is mounted in a form-fitting manner in a holding element mount arranged in the outer casing section. It is an advantage in this case that the holding element can be inserted easily into the holding element mount, wherein the holding element does not need to be connected by a material-bonding connection, such as a weld, to the connector body. Thus the assembly of the connector can be simplified and also accelerated thereby.

Furthermore, the holding element can comprise a holding section which spans the passage. It is an advantage here that by means of the holding section the locking element can be held in the connector body.

An embodiment is also advantageous in which the holding element comprises a support section which is arranged on the side of the fastening section opposite the holding section. The support section can act as a counter support to the holding section to secure the holding element against rotation in the connector body. In particular, it is possible that the holding element in the area of the fastening section is drawn by the form-fitting connection to the connector body in the direction of the center of the connector body and that the holding element can be supported on the connector body in the area of the holding section and in the area of the support section, which are arranged to the right and left of the fastening section, whereby the holding element is mounted on the connector body to be rigid position and secured against rotation.

According to one development it is possible that the holding section comprises a support tab in a support area by means of which the holding section is arranged at a distance from the passage and spans the latter. By means of the support tab it is possible for the holding section is to be arranged at a specific distance from the passage and thus the locking element can be moved from the locked position to the release position.

Furthermore, it can be advantageous that the holding element in the area of the securing section comprises at least one fastening nose for gripping behind the holding element mount. In this way the holding element can be mounted in a form-fitting manner in the holding element mount. In particular, by means of the fastening nose it is possible to achieve a firm fit of the holding element in the holding element mount.

Furthermore, the holding element in the area of the fastening section can have an approximately centrally positioned longitudinal slit. The advantage of this is that the holding element can be compressed in this way so that the fastening noses can move towards one another and the holding section can be inserted into the holding element mount.

Furthermore, it is possible for the holding element to have a beveling in the area of the holding section. The advantage of the beveling is that the holding element in the fastening section tapers outwardly, whereby it can be inserted easily into the holding section of the connector body.

According to a particular embodiment is it possible for the holding element to have a tab in the area of the fastening section, wherein the sheet metal is folded at an angle of between 90° and 240°, in particular between 140° and 210°, preferably between 175° and 185°. In particular, in this way the holding element can be shaped n one piece as a sheet metal molded part.

BRIEF DESCRIPTION OF THE DRAWINGS

For a better understanding of the invention the latter is explained in more detail with reference to the following Figures.

In a much simplified, schematic representation.

DETAILED DESCRIPTION OF THE PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 1:
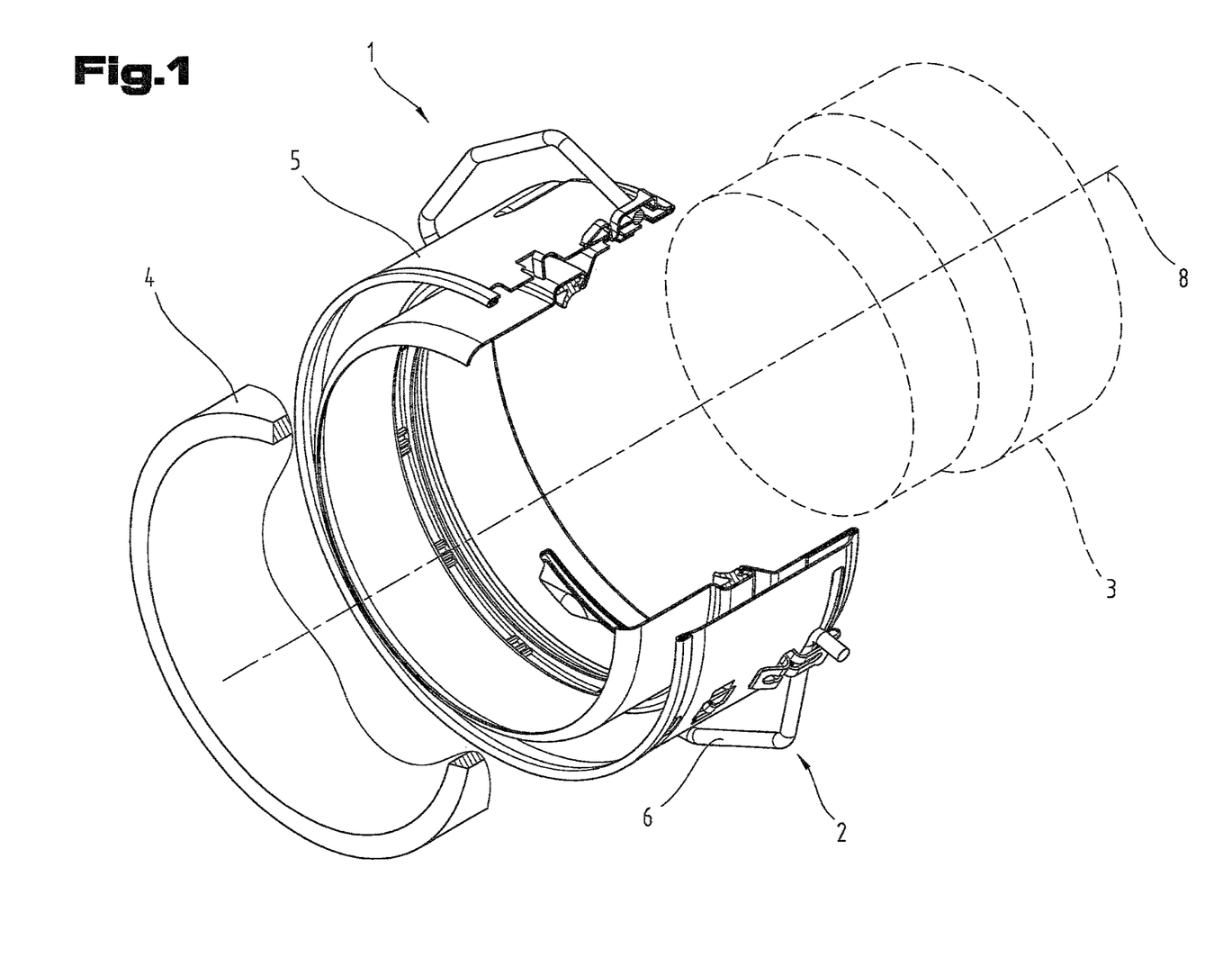
FIG. 1 is a perspective representation of an embodiment variant of a connector assembly in a quarter section.

FIG. 1 shows a perspective view of a connector assembly 1 with a connector 2, wherein the latter is shown in a quarter section. Furthermore, FIG. 1 shows schematically a counter connector 3, which can be connected with the connector assembly 1. The interconnection between the connector assembly 1 and a counter connector 3 is described in detail in AT 509 196 B1.

Furthermore, a pipe 4 is shown schematically to which the connector 2 can be coupled. The pipe 4 can for example be a rigid element, such as plastic pipe. In another embodiment variant the pipe 4 can be made as a flexible conduit from a rubber material.

The connector 2 comprises a connector body 5, which is preferably designed as a one-piece molded part, such as a deep-drawn part, in particular made of stainless steel plate.

The connector assembly 1 is preferably used in a motor vehicle, in particular in a road vehicle with a combustion engine, such as a car or a lorry.

Of course, it is also possible for the connector assembly 1 to be used differently with a combustion engine. This can include for example the use of the connector assembly 1 in a stationary assembly, a ship's engine, an aircraft engine, a construction machine etc.

In particular, the connector assembly 1 can be used for connecting different components of the fresh air supply to the combustion engine. For example, it is possible that the connector 2 is provided with the corresponding counter connector 3 for connecting two parts in the suction area of a turbocharger. Furthermore, it also possible for example to insert such a connector assembly 1 in the pressure side coming from the turbocharger for connecting two components.

Figure 2:
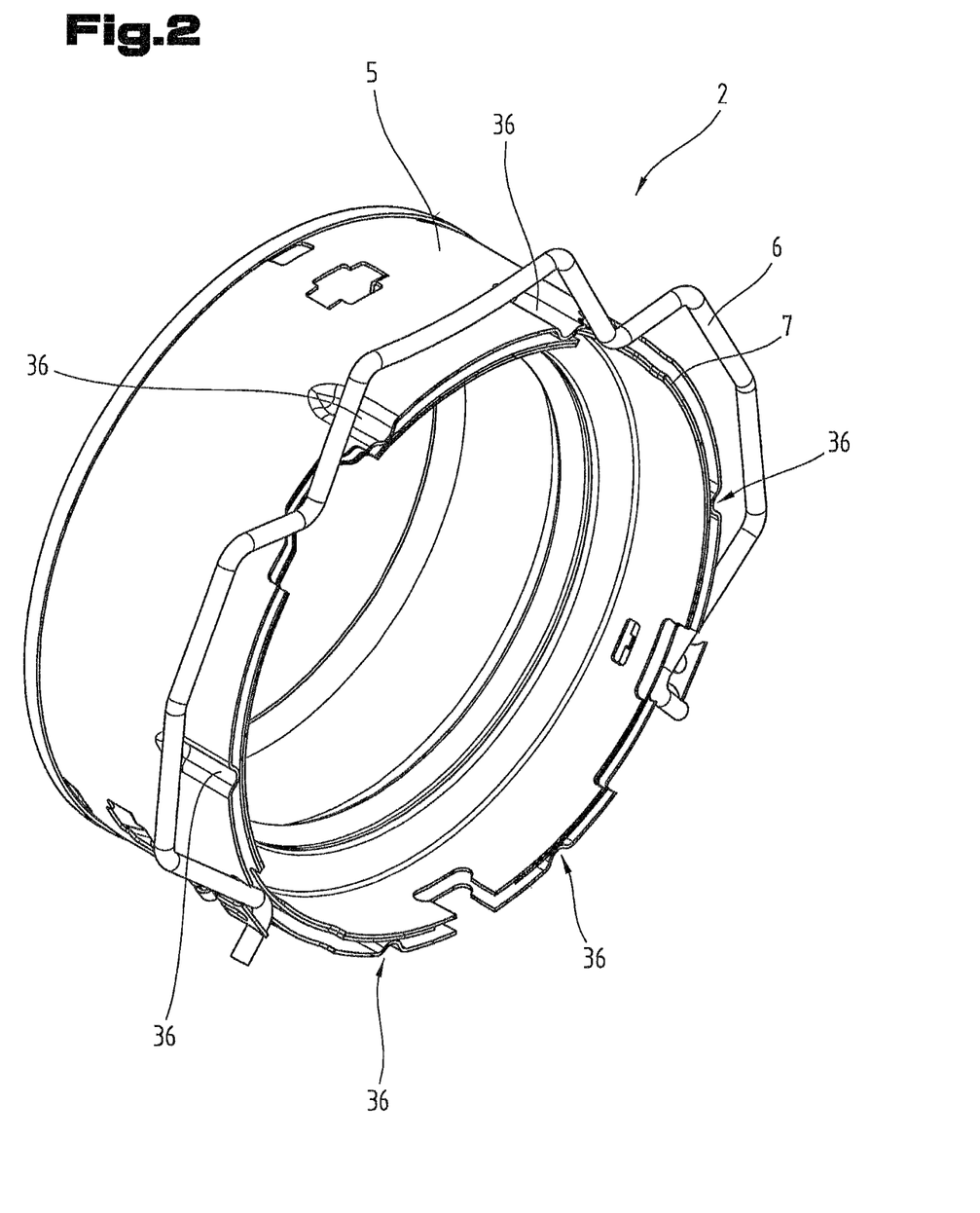
FIG. 2 is a cross-section of an embodiment of the connector with a cross-section in the area of a locking element.

FIG. 2 shows a cross-section of the connector 2, wherein the cross-sectional line is selected so that a locking element 6 installed in the connector 2 for securing the connector 2 and the counter connector 3 to one another is shown.

The locking element 6 is constructed so that it can be activated and deactivated easily, so that the connector 2 and the counter connector 3 can be separated from one another or connected to one another as necessary. The locking element 6 can be moved into a locked position, in which the connector 2 and the counter connector 3 are secured to one another. Furthermore, the locking element 6 can be moved into a release position, in which the counter connector 3 can be inserted into the connector 2 or can be removed from the latter.

As also shown in FIG. 2, a reinforcing element 7 is inserted into the connector body 5 which reinforcing element is used for improving the rigidity of the connector body 5. The reinforcing element 7 can be designed as a sleeve segment, as shown clearly in FIG. 2, and can therefore comprise an intermediate piece which has an open circumference. In a further embodiment variant the reinforcing element 7 can be designed as a sleeve and can therefore have a closed circumference.

Figure 3:
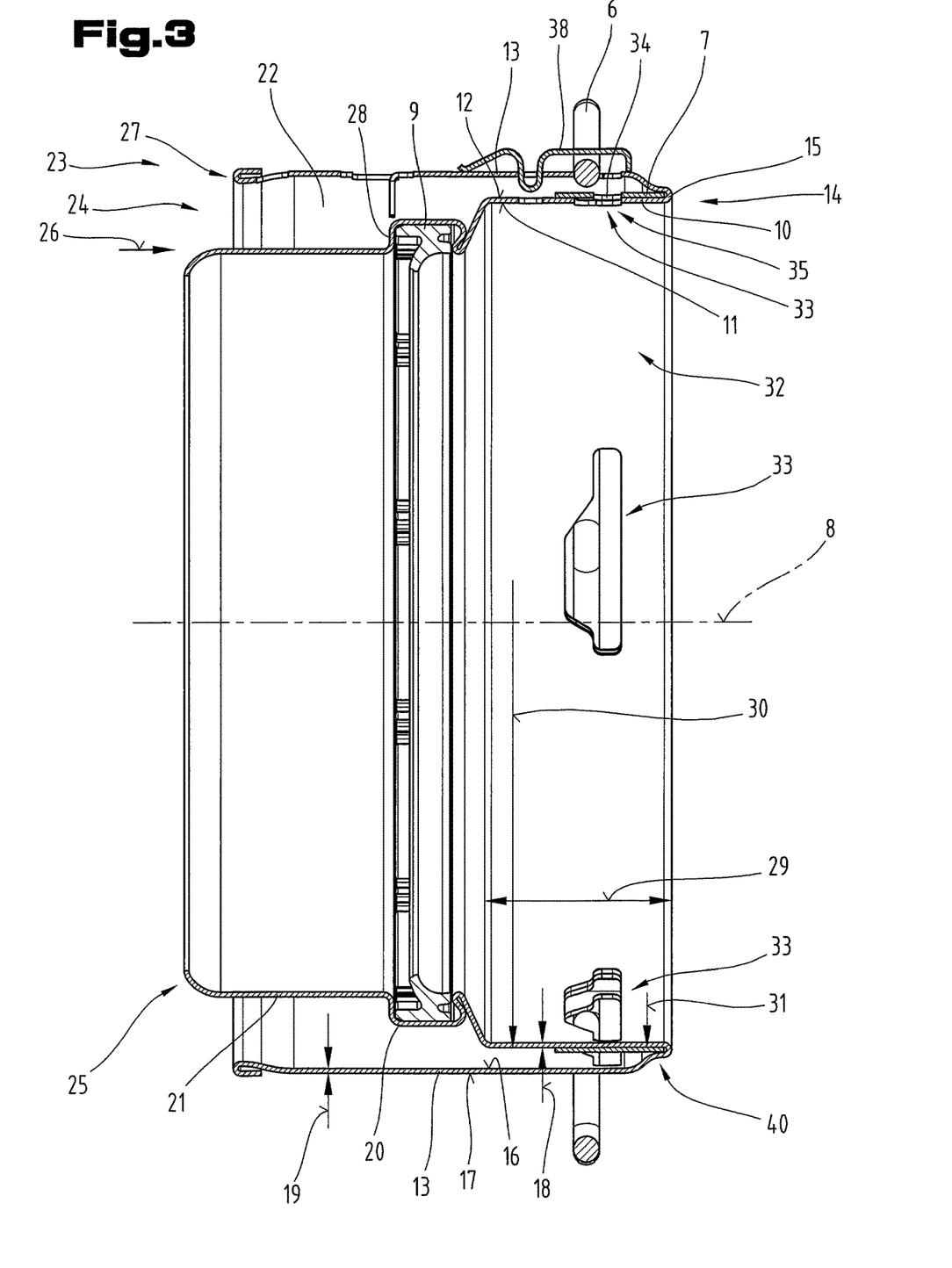
FIG. 3 is a cross-sectional view of the connector with a cross-section along a central longitudinal axis of the connector.

FIG. 3 shows a cross-section of the connector assembly 1 along a central longitudinal axis 8 of the connector 2.

As shown clearly in FIG. 3, the connector 2 can comprise a connector seal 9 next to the connector body 5, which seal is mounted in the connector body 5. The connector seal 9 is used to seal the connector sufficiently in the plugged-in state with the counter connector 3.

As shown in FIG. 3, on the connector body 5 an inner casing section 10 is formed which surrounds the central longitudinal axis 8 of the connector 2 in a sleeve-like manner. In other words, the inner casing section 10 is a rotationally-symmetrical hollow cylinder.

The inner casing section 10 comprises an inner casing surface 11 and an outer casing surface 12. An outer casing section 13 surrounds the inner casing section 10, which outer casing section is also designed to be rotationally symmetrical relative to the central longitudinal axis 8. The inner casing section 10 is connected to the outer casing section 13 at a first end section 14 by means of a first end wall section 15. The first end wall section 15 can be designed differently. In particular, the first end wall section 15 can be designed in the form of a fold, the outer casing section 13 being folded by about 180° relative to the inner casing section 10, whereby the outer casing section 13 is arranged surrounding the inner casing section 10.

As with the inner casing section 10 the outer casing section 13 also comprises an inner casing surface 16 and an outer casing surface 17.

The inner casing section 10 is delimited by its inner casing surface 11 and the outer casing surface 12, thereby forming a wall thickness 18 of the inner casing section 10. The outer casing section 13 is also delimited by an inner casing surface 16 and an outer casing surface 17, thereby forming the wall thickness 19 of the outer casing section 13.

The inner casing section 10 is designed to be stepped in the shown embodiment. It is possible that a seal mount 20 adjoins the inner casing section 10 on the opposite side of the first end section 14 of the connector 2, which seal mount is also formed in the connector body 5. A connector seal 9 can be mounted in such a seal mount 20. Furthermore, it is also possible that a third casing section 21 adjoins the seal mount 20, which casing section together with the outer casing section 13 forms an annular space 22 for receiving the pipe 4.

The outer casing section 13 and the third casing section 21 are open to one another at a second end section 23 of the connector 2, thereby forming a pipe receiving side 24 of the connector body 5.

It is possible for the third casing section 21 in the area of the second end section 23 to have a beveling 25 which is formed on the pipe receiving side 24. Such a beveling 25 has the advantage that the pipe 4 or a sealing element used for sealing the pipe 4 can be inserted easily in insertion direction 26 into the annular space 22. Furthermore, it is also possible for the outer casing section 13 to have such a beveling 27 so that the pipe 4 can also be pushed easily into the annular space 22. Afterwards, the pipe 4 can be pressed together with the connector body 5 so that the two components form a single unit.

The beveling 25, 27 can be formed for example by beading having corresponding radii or by widenings and are preferably formed during the deep-drawing process.

Preferably, the connector body 5 is produced by means of a deep-drawing process, wherein all of the wall thicknesses of the casing sections of the connector body 5 are about the same size.

As shown in the view of FIG. 3, it can also be advantageous for the seal mount 20 to have an end face wall 28 which adjoins the third casing section 21. By means of the end face wall 28 in particular a mounting recess can be formed for the connector seal 9.

The inner casing section 10 has an outer diameter 30 and an axial extension 29. An inner diameter 31 of the reinforcing element 7 is preferably approximately the same size as the outer diameter 30 of the inner casing section 10.

In the area of the inner casing section 10 the connector 2 has a receiving space 32. The receiving space 32 is surrounded by the inner casing section 10 and is used for receiving a portion of the counter connector 3.

The connector body 5 comprises a plurality of passages 33 which are spaced apart from one another in circumferential direction which are also arranged in the area of the inner casing section 10. In the locking position of the locking element 6, which the latter adopts in the inserted and locked state, the locking element 6 projects through the respective passage 33 into the receiving chamber 32. In said sections the locking element 6 interacts with a locking surface of a locking shoulder of the counter connector 3.

It is also shown in FIG. 3 that the reinforcing element 7 comprises a recess 34 which corresponds with one of the passages 33 and thus the locking element 6 can be guided through the reinforcing element 7. In particular, it is possible for a first type of passage 33' and a second type of passage 33" to be formed. Corresponding with the latter a first type of recess 34' and a second type of recess 34" can be formed.

In particular, the recess 34" of the reinforcing element 7 and the passage 33" of the connector body 5 have at least partly the same outer contour and are arranged to be congruent with one another.

In particular the passage 33' and the recess 34' can be designed to be fully congruent, thereby forming a joint passage 35.

As shown in an overview of FIGS. 2 and 3, it is also possible that in the outer casing section 13 of the connector body 5 one or more beadings 36 are inserted, by means of which the reinforcing element 7 can be clamped into the intermediate space between the inner casing section 10 and outer casing section 13. By means of the beadings 36 the reinforcing element 7 can be fixed in radial direction or can be held in position by radial clamping in axial direction if necessary. The beadings 36 can also be used to increase the stability of the outer casing section 13.

Figure 4:
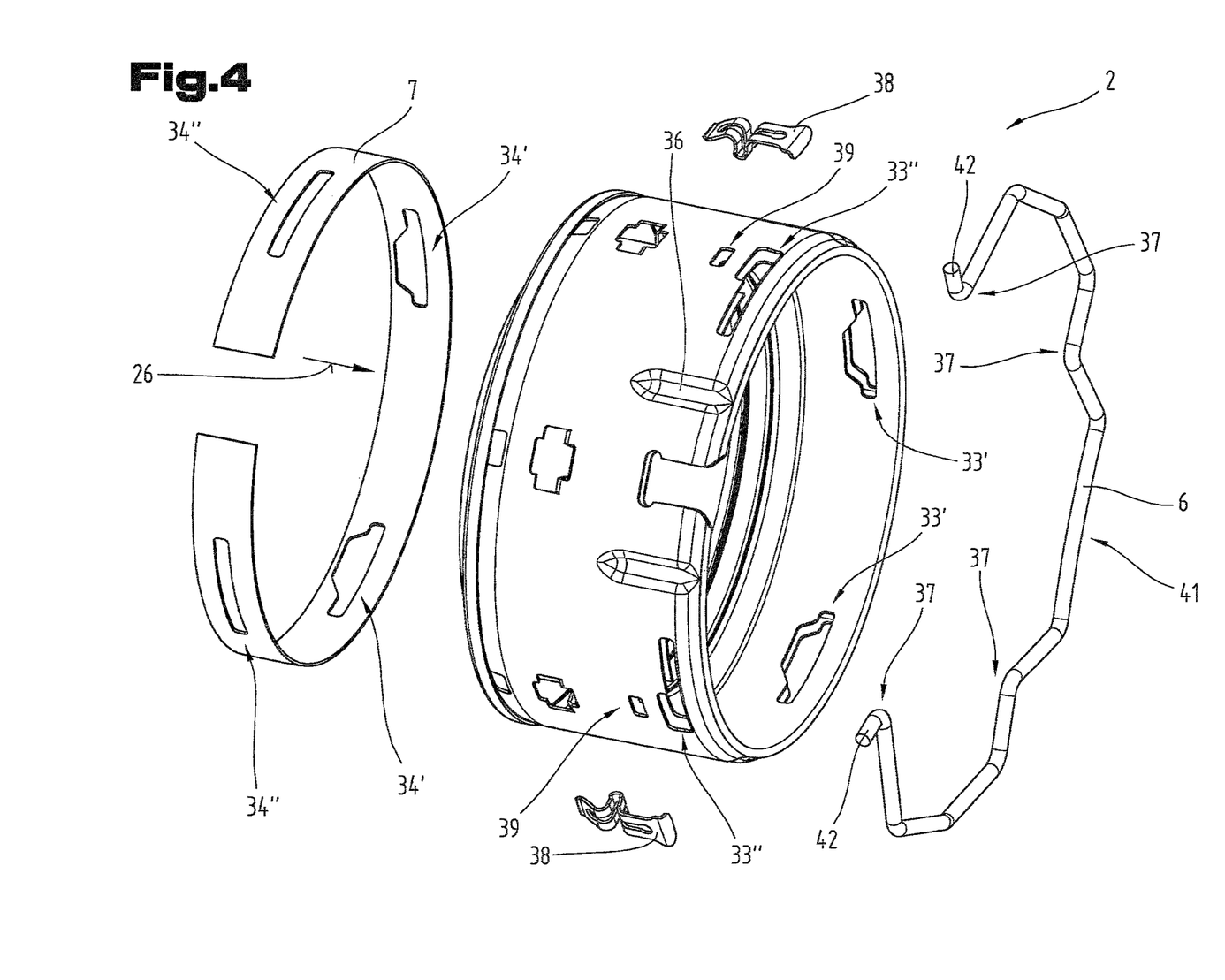
FIG. 4 is an exploded view of the connector.

FIG. 4 shows an exploded view of the individual components of the connector 2, wherein the same reference numerals and component names are used for the same parts as in the preceding FIGS. 1 to 3. To avoid unnecessary repetition, reference is made to the detailed description of the preceding FIGS. 1 to 3.

It is shown clearly in FIG. 4 that the locking element 6 can comprise four locking areas 37 for example, which are designed to pass through the passages 33 of the connector body 5. The locking areas 37 are therefore designed as inwardly pointing V-shaped elements. As also shown in FIG. 4, the connector 2 also comprises holding elements 38, which are inserted into a holding element mount 39 and are used for securing the locking element 6.

The reinforcing element 7 is shown as already prefabricated in FIG. 4, where it is prebent and the recesses 34 have already been formed in the reinforcing element 7. In particular, as shown, the reinforcing element 7 can be designed as a sleeve segment. Furthermore it is shown for example that the two recesses 34" can be designed to be slit-like. The two recesses 34' can have exactly the same outer contour as the corresponding passages 33'.

In a further not shown embodiment variant it is also possible that the recesses 34 are not made or are only partly formed in the prefabricated reinforcing element 7 and that the latter are only formed when the reinforcing element 7 is inserted into the connector body 5. Here the reinforcing element 7 can be punched in the inserted state together with the connector body 5.

In order to reinforce the connector body 5 with the reinforcing element 7, the reinforcing element 7 can have a higher strength than the connector body 5. As the reinforcing element 7 does not need to be shaped as much as the connector body 5, the connector body 5 can be made from a first material and the reinforcing element 7 can be made from a second material, wherein the second material is less deformable than the first material.

In the following the possible method of assembly of the connector 2 is described. In a first method step the connector body 5 is produced by shaping, in particular by deep-drawing, from a flat sheet metal material. Here during the deep-drawing process the recesses 34 and 39 formed in the circumference of the connector body 5 can be punched out.

In a further method step the reinforcing element 7 can also be shaped by forming.

Furthermore, it is possible that at least one of the passages 33 and the corresponding recess 34 are only produced in a following punching process when the reinforcing element 7 is already placed into the connector body 5. In this way the recess 34 and the passage 33 can be produced in the form of a joint passage 35, wherein by means of the punching process the reinforcing element 7 and the connector body 5 can fit into one another in a wedge-like manner and in this way the axial positioning of the reinforcing element 7 is improved.

In an alternative variant it is possible that the recesses 34 are inserted into the reinforcing element 7 before placing into the connector body 5.

In a further method step the reinforcing element 7 can be pushed into the connector body 5 in insertion direction 26 and inserted into the latter. It is possible in this case that the reinforcing element 7 is inserted into a fold area 40 which is formed in the connector body 5 in the area of the end wall section 15. By means of this fold area 40 a narrow slit can be formed radially into which the reinforcing element 7 can be inserted. In particular, it is possible for the reinforcing element 7 to be clamped in the fold area 40.

In addition, beadings 36 are used for the axial and radial positioning and for fixing the reinforcing element 7. The latter can be inserted in advance into the connector body 5. In an alternative method of production the beadings 36 can also be inserted after inserting the reinforcing element 7 into the connector body 5 in order to clamp the reinforcing element 7.

In a further method step the locking element 6 can be inserted into the connector body 5 and afterwards the holding elements 38 can be used for securing the locking element 6 into the connector body 5.

The locking element 6 comprises a holding area 41 which can be gripped in order to be inserted into the connector body 5 and moved between a locked position and a release position.

Figure 5:
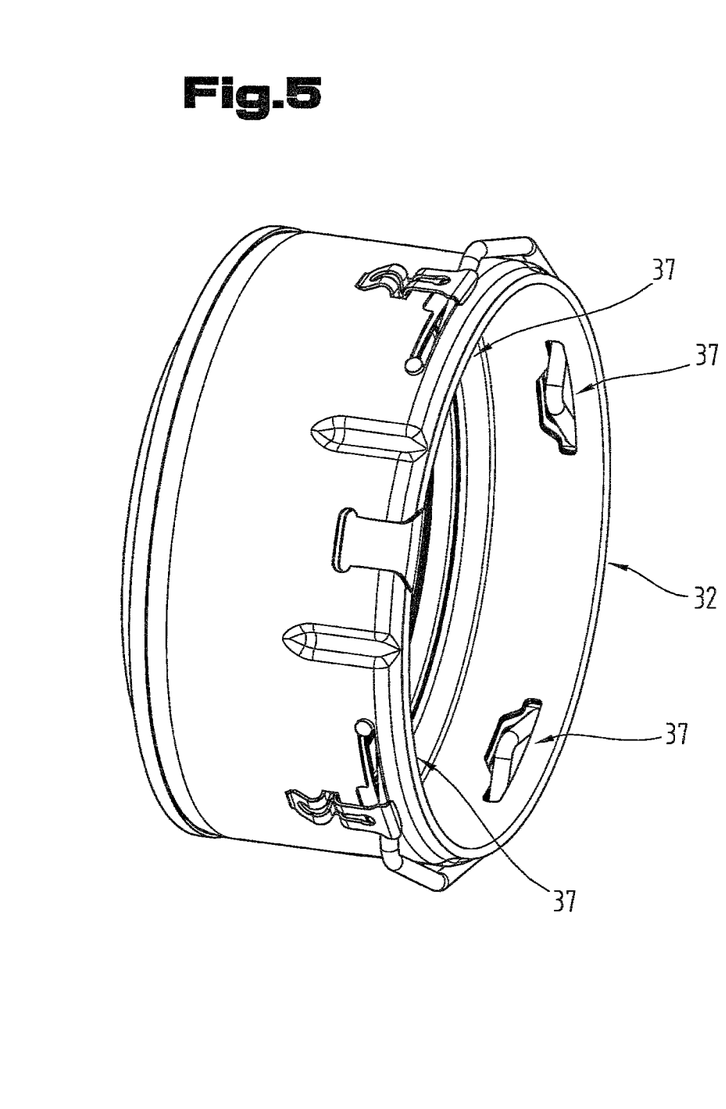
FIG. 5 is a perspective view of the connector, wherein the locking element is in a locked position.

FIG. 5 shows a perspective view of the connector 2, where the locking element 6 is in the locked position.

Figure 6:
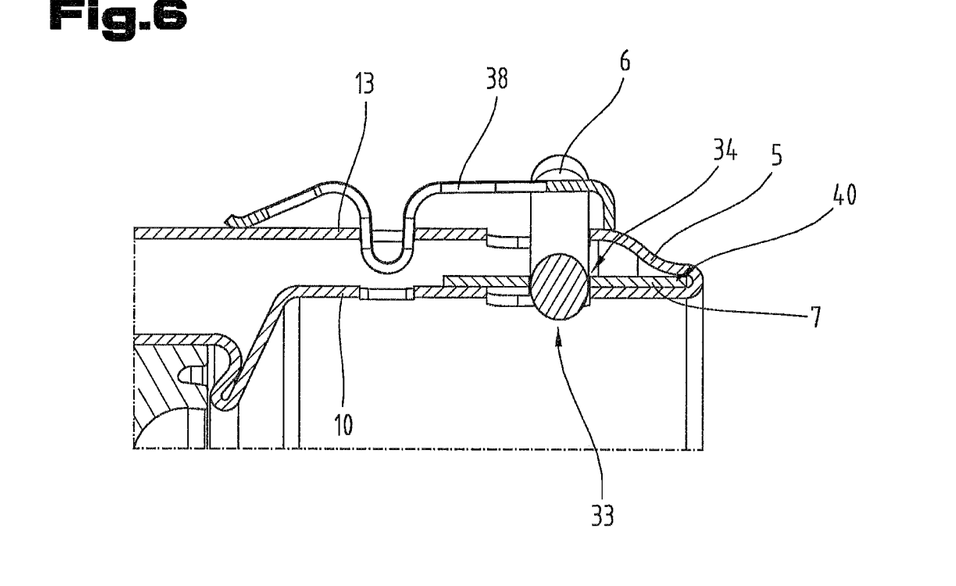
FIG. 6 is a detailed view of the locking element, wherein the locking element is in a locked position.

FIG. 6 shows a detailed view of the locking element 6 which is in the locked position.

Figure 7:
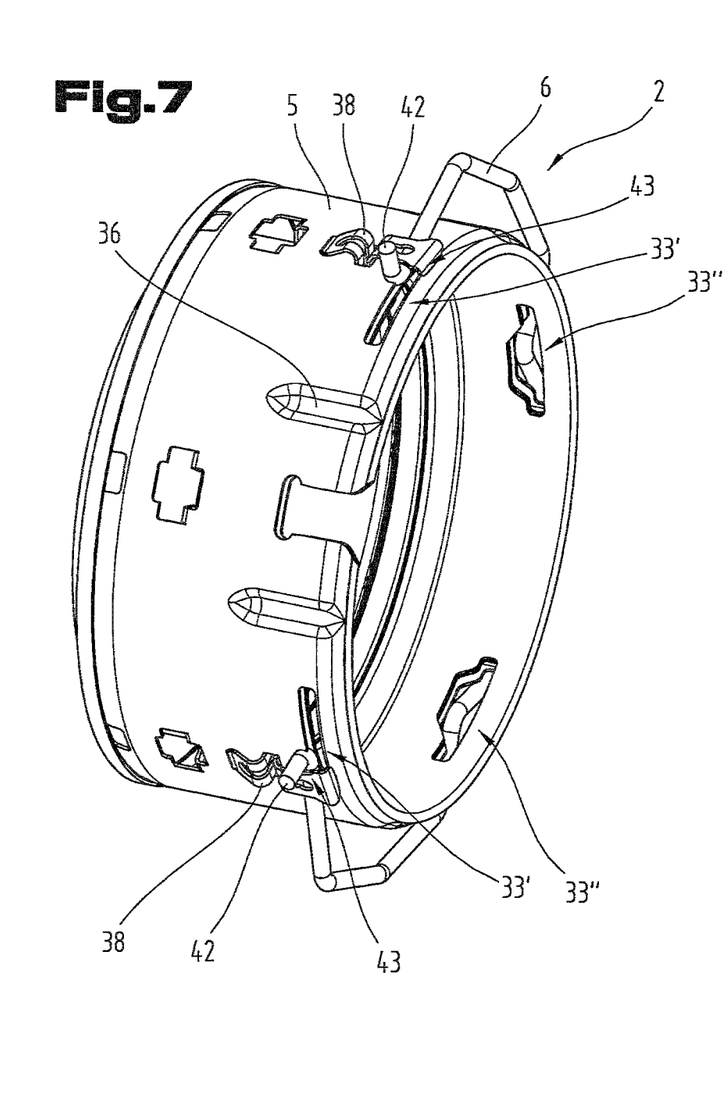
FIG. 7 is a perspective view of the connector, wherein the locking element is in a release position.

FIG. 7 shows a perspective view of the connector 2, where the locking element 6 is in the release position.

Figure 8:
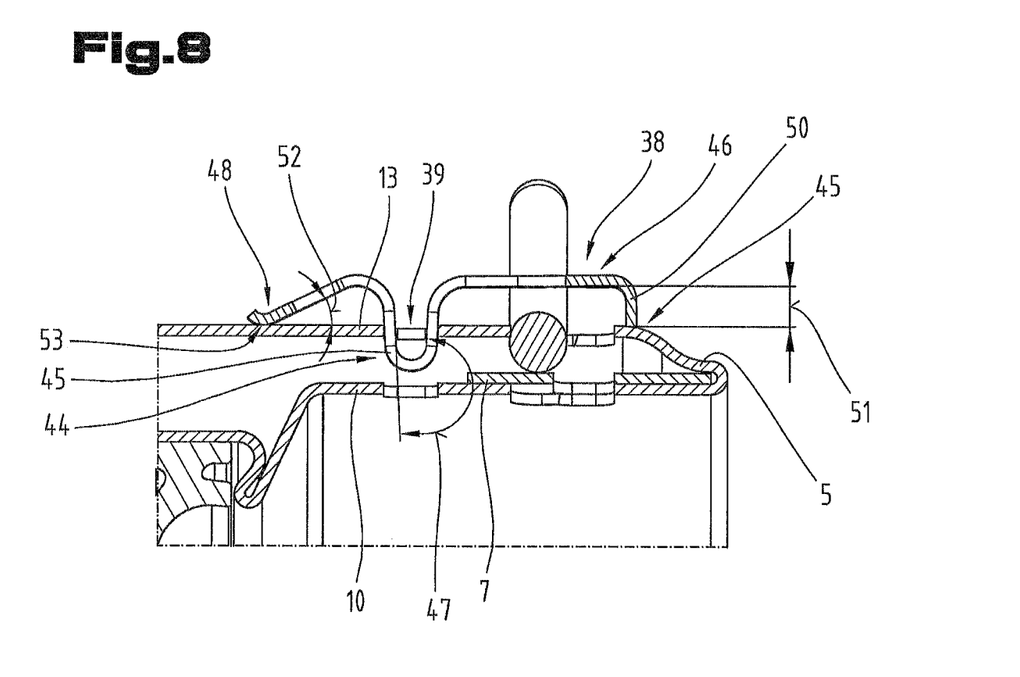
FIG. 8 is a detailed view of the locking element, wherein the locking element is in a release position.

FIG. 8 shows a detailed view of the locking element 6 which is in the release position.

FIGS. 5 to 8 show a further and possibly independent embodiment of the connector 2, wherein the same parts and component names are used for the same parts as in the preceding FIGS. 1 to 4. To avoid unnecessary repetition reference is made to the detailed description of the preceding FIGS. 1 to 4.

The locking position of the locking element 6 is shown particularly clearly in an overview of FIGS. 5 and 6, and the release position of the locking element 6 is shown in an overview of FIGS. 7 and 8. When the locking element 6 is in its locking position the locking areas 37 project into the receiving space 32 and the counter connector 3 is secured axially relative to the connector 2. When the locking element 6 is in its release position the locking areas 37 do not project into the receiving space 32 and the counter connector 3 can be displaced axially relative to the connector 2.

As shown in FIG. 6 the recess 34 can be designed to be slit-like in the reinforcing element 7, where the slit has a width which corresponds approximately to the diameter of the locking element 6. In this way the locking element 6 can be fixed axially.

If the locking element 6 at the holding area 41 is drawn in radial direction away from the longitudinal axis of the connector 2, due to the geometry of the locking element 6 the locking areas 37 are removed from the receiving space 32. In particular, the locking element 6 is moved so far radially outwards until it is moved into the release position according to FIGS. 7 and 8.

Shortly before reaching the release position a guide pin 42 of the locking element 6 contacts the holding element 38 and is axially deflected by the latter so that the locking element 6 moves into the release position. In particular, it is possible for a beveling 43 to be formed in the holding element 38, by means of which with radial tension on the holding area 41 an axial movement is introduced to the locking element 6. After the completion of the axial displacement the locking element 6 can be released, whereby the guide pin 42 bears on the connector body 5 or, as shown particularly clearly in FIG. 8, bears on the reinforcing element 7 and thus remains in the release position in which the locking element 6 is pretensioned.

In order to move the locking element 6 out of the release position back into the locking position, the locking element 6 can be displaced slightly axially and from the prestressing of the locking element 6 the latter moves automatically back into the locked position, as soon as it can enter into the recesses 34' of the locking element 6.

The exemplary embodiments show possible embodiment variants, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Figure 9:
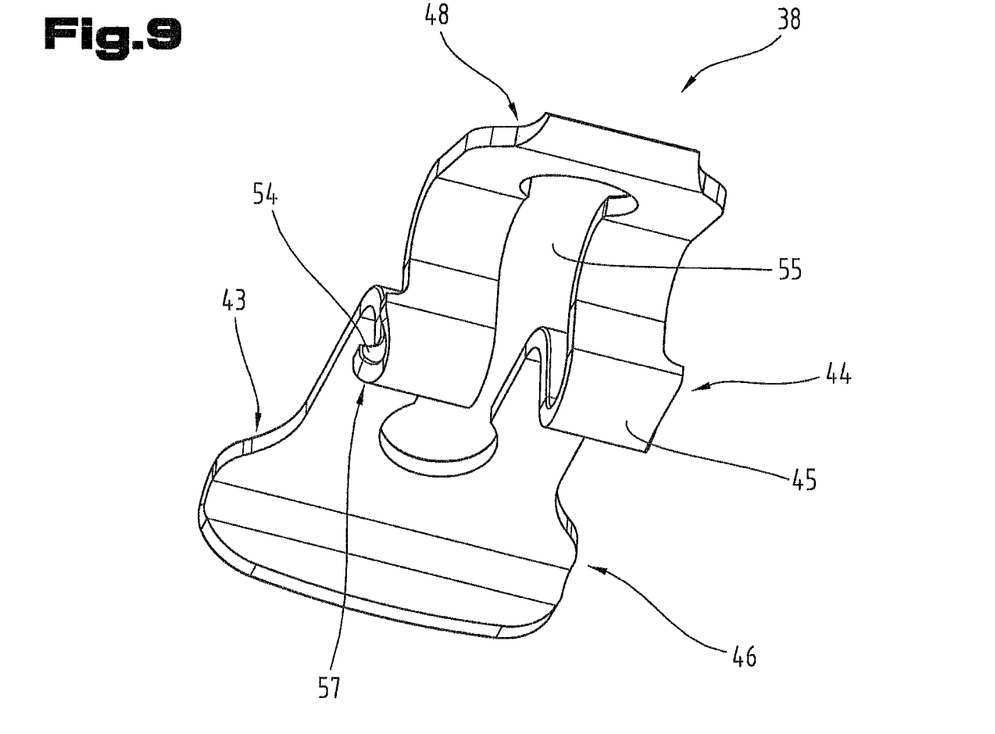
FIG. 9 is a perspective view of the holding element.

FIG. 9 shows the holding element 38 in a perspective view.

Figure 10:
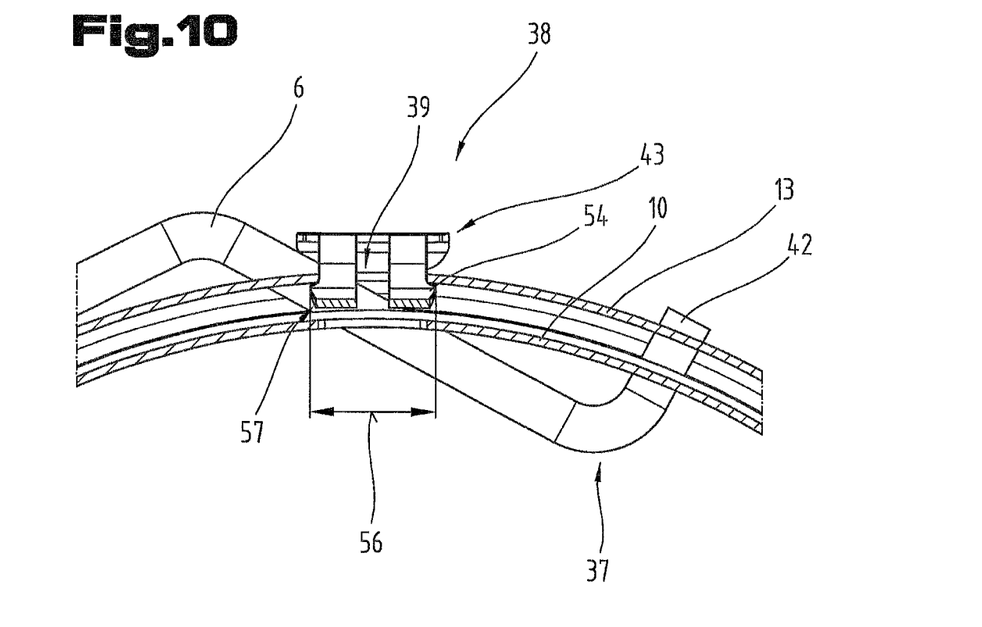
FIG. 10 is a cross-section of the connector in the area of the holding element.

FIG. 10 shows a cross-section of the connector in the area of the holding element.

FIGS. 9 and 10 show an additional and possibly independent embodiment of the connector 2, wherein the same reference numerals and component names are used for the same parts as in the preceding FIGS. 1 to 8. To avoid unnecessary repetition, reference is made to the detailed description of the preceding FIGS. 1 to 8.

The function of the holding element and its structure is described with reference to an overview of FIGS. 7, 8, 9 and 10.

The holding element 38 is preferably designed as sheet metal formed part and therefore has a constant wall thickness. Preferably, the holding element 38 is designed in one piece.

In particular, it is possible that the holding element 38 comprises a fastening section 44 which is designed in the form of a tab 45. The fastening section 44 can be inserted into the holding element mount 39 of the connector body 5.

In particular, it is possible that as viewed in a longitudinal extension of the holding element 38 a holding section 46 is formed at a first longitudinal end, which holding section spans the passage 33' and is used for securing the locking element 6. The fastening section 44 can be formed directly adjoining the holding section 46.

The fastening section 44 can be formed by the tab 45, whereby the metal sheet is folded at an angle of between 90° and 240°, in particular between 140° and 210°, preferably between 175° and 185°.

On the side of the tab 45 opposite the holding section 46 a support section 48 is formed. The support section 48 is used in particular to provide a counter support to the holding section 46. By means of the support section 48 the torque introduced into the holding element 38 in the holding section 46 can be absorbed.

Furthermore, it is possible for the holding section 46 to bear in a support area 49 on the connector body 5, wherein a support tab 50 is formed by means of which the holding section 46 can be positioned at a distance 51 from the connector body 5. The support tab 50 can be arranged for example at right angles to the holding section 46.

As shown particularly clearly in FIG. 8 the holding section 46 can be arranged in the installed state of the holding element 38 parallel to the outer casing section 13. The support section 48 can be arranged at a support angle 52 relative to the outer casing section 13. In a support area 53 the support section 48 can bear on the outer casing section 13.

As shown particularly clearly in FIGS. 9 and 10, the holding element 38 can comprise on the two longitudinal sides respectively a fastening nose 54 in the area of the fastening section 44, which fastening nose is designed to project relative to the fastening section 44. The fastening nose 54 is preferably designed so as to grip in a form-fitting manner behind the outer casing section 13 of the connector body 5 in the area of the holding element mount 9 and thus ensure that the holding element 38 is fastened in a form-fitting manner to the connector body 5.

The holding element 38 is preferably designed so that in the installed position it is pretensioned due to its elasticity and it resilient properties between the fastening section 44 and holding section 46 or support section 48. In this way it is possible for the holding element 38 to be secured in a stable manner onto the connector body 5.

In order to insert the holding element 38 into the connector body 5, in the holding element 38 a longitudinal slit 55 can be formed extending in the longitudinal direction of the holding element 38. The longitudinal slit 55 is formed in particular in the area of the fastening section 44. As the holding element 38 has a longitudinal slit, the latter can be pushed together with regard to its width 56 to be able to insert the holding element 38 into the holding element mount 39. In particular, in this way the fastening noses 54 can be pushed inwards so far that they can be guided through the opening of the holding element mount 39 and can grip behind the latter in a form-fitting manner after the elastic restoring of the holding element 38.

In order to insert the holding element 38 more easily into the holding element mount 39 in the area of the fastening section 44 an insert beveling 57 can be formed. By means of this insert beveling 57 the holding element 38 can be compressed in width 56 when pushing into the holding element mount 39. In this way the insertion process of the holding element 38 into the holding element mount 39 can be facilitated.

The scope of protection is defined in the claims. To interpret the claims the description and the drawings should be referred to. Individual features or combinations of features from the various different shown and described embodiments can represent independent solutions of the invention. The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure some elements have not been represented true to scale in part and/or have been enlarged and/or reduced in size.

| | List of reference numerals |
|---|---|
| 1 | connector assembly |
| 2 | connector |
| 3 | counter connector |
| 4 | pipe |
| 5 | connector body |
| 6 | locking element |
| 7 | reinforcing element |
| 8 | longitudinal axis of the connector |
| 9 | connector seal |
| 10 | inner casing section |
| 11 | inner casing surface |
| 12 | outer casing surface |
| 13 | outer casing section |
| 14 | first end section of connector |
| 15 | end face section |
| 16 | inner casing surface |
| 17 | outer casing surface |
| 18 | wall thickness of first casing section |
| 19 | wall thickness of second casing section |
| 20 | seal mount of connector |
| 21 | third casing section |
| 22 | annular space |
| 23 | second end section of connector |
| 24 | pipe receiving side |
| 25 | beveling |
| 26 | insertion direction |
| 27 | beveling |
| 28 | end wall of seal mount |
| 29 | axial extension of first casing section |
| 30 | outer diameter of first casing section |
| 31 | inner diameter |
| 32 | receiving space |
| 33 | passage |
| 34 | recess |
| 35 | joint passage |
| 36 | beading |
| 37 | locking area |
| 38 | holding element |
| 39 | holding element mount |
| 40 | fold area |
| 41 | holding area |
| 42 | guide pin |
| 43 | beveling |
| 44 | fastening section |
| 45 | tab |
| 46 | holding section |
| 47 | angle |
| 48 | support section |
| 49 | support area of holding section |
| 50 | support tab |
| 51 | distance |
| 52 | support angle |
| 53 | support area of support section |
| 54 | fastening nose |
| 55 | longitudinal slit |
| 56 | width |
| 57 | insert beveling |

The invention claimed is:

1. A connector for connecting conduits for liquid or gaseous media, comprising:
   a central longitudinal axis;
   a connector body comprising at least one sleeve-shaped outer casing section surrounding in cross-section the central longitudinal axis and comprising first and second passages;
   first and second locking elements, the first locking element comprising a first locking element end section and the second locking element comprising a second locking element end section; and
   first and second holding elements for securing the first and second locking elements, respectively, separately arranged in an area of the first and second passages, respectively;
   wherein the first and second passages are adapted to receive the first and second locking element end sections, respectively, for securing the connector relative to a counter connector;
   wherein each of the first and second holding elements comprises a sheet-formed part; and
   wherein the first holding element comprises a first holding section which spans the first passage and wherein the second holding element comprises a second holding section which spans the second passage.

2. The connector as claimed in claim 1,
   wherein the connector body comprises an annular space which lies between a sleeve-shaped inner casing section in cross-section surrounding the central longitudinal axis and the outer casing section of the connector,
   wherein the inner casing section is surrounded by the outer casing section and is connected to the outer casing section at a first end section by a first end wall section and the inner and outer casing sections are open to one another at a second end section, and
   wherein the first and second passages pass through both the inner casing section and the outer casing section.

3. The connector as claimed in claim 1, wherein the first holding element comprises a first fastening section, by means of which the first holding element is mounted in a form-fitting manner in a first holding element mount arranged in the outer casing section and wherein the second holding element comprises a second fastening section, by means of which the second holding element is mounted in a form-fitting manner in a second holding element mount arranged in the outer casing section.

4. The connector as claimed in claim 3, wherein the first holding element has at least one first fastening nose for gripping behind the first holding element mount in the area of the first fastening section and wherein the second holding element has at least one second fastening nose for gripping behind the second holding element mount in the area of the second fastening section.

5. The connector as claimed in claim 3, wherein the first holding element has an approximately centrally arranged first longitudinal slit in the area of the first fastening section and wherein the second holding element has an approximately centrally arranged second longitudinal slit in the area of the second fastening section.

6. The connector as claimed in claim 3, wherein the first holding element has a first tab made of sheet metal in the area of the first fastening section, wherein the second holding element has a second tab made of sheet metal in the area of the second fastening section, and wherein the sheet metal is folded at an angle (47) of between 90° and 240°.

7. The connector as claimed in claim 1, wherein the first holding element comprises a first support section, which is arranged on a side of the first fastening section opposite the first holding section and wherein the second holding element comprises a second support section, which is arranged on a side of the second fastening section opposite the second holding section.

8. The connector as claimed in claim 1, wherein the first holding section comprises a first support tab in a first support area by means of which first support tab the first holding section is arranged at a first distance from and spans the first passage and wherein the second holding section comprises a second support tab in a second support area by means of which second support tab the second holding section is arranged at a second distance from and spans the second passage.

9. The connector as claimed in claim 1, wherein the first holding element has a first beveling in the area of the first holding section and wherein the second holding element has a second beveling in the area of the second holding section.

* * * * *